No. 658,874. Patented Oct. 2, 1900.
J. A. SPENCER.
VALVE FOR PNEUMATIC TIRES.
(Application filed Feb. 7, 1900.)
(No Model.)
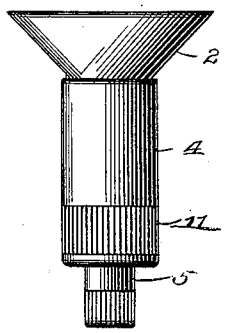
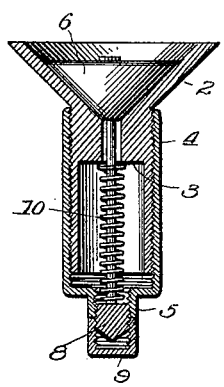 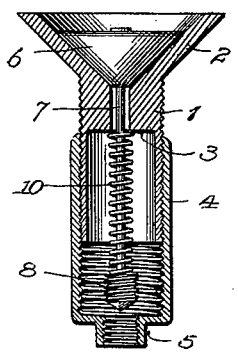
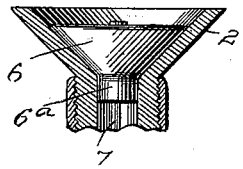
Witnesses:
Harry S. Robinson
F. M. Cleary
Inventor:
John A. Spencer
By Victor J. Evans
Attorney

UNITED STATES PATENT OFFICE.

JOHN A SPENCER, OF LOS ANGELES, CALIFORNIA.

VALVE FOR PNEUMATIC TIRES.

SPECIFICATION forming part of Letters Patent No. 658,874, dated October 2, 1900.

Application filed February 7, 1900. Serial No. 4,379. (No model.)

*To all whom it may concern:*

Be it known that I, JOHN A SPENCER, a citizen of the United States, residing at Los Angeles, in the county of Los Angeles and State of California, have invented certain new and useful Improvements in Valves for Pneumatic Tires, of which the following is a specification.

My invention relates to valves for pneumatic tires for bicycles, &c., the object being to provide a device of this character of simple and economical construction which may be readily manipulated to permit of the attachment of a pump-tube and to close the valve after the inflation of the tire.

The construction of the improvement will be fully described hereinafter and defined in the appended claims in connection with the accompanying drawings, which form a part of this specification, and in which—

Figure 1 is a side elevation of the valve in closed position. Fig. 2 is a longitudinal section of the same. Fig. 3 is a longitudinal section of the valve in open position and with its dust-cap removed, and Fig. 4 is a longitudinal section of a modification.

The valve-casing comprises a hollow cylindrical body portion 1 and a hollow conical seat or shell 2. The cylindrical portion of the casing is formed with an internal annular shoulder 3, and its exterior is screw-threaded for the attachment of an internally-threaded sleeve 4, the outer end of which terminates in an internally-threaded nipple 5.

6 designates a conical valve fitting the seat 2 and provided with a stem 7, which extends within the sleeve 4 and terminates at its outer end in a threaded plug or enlargement 8, preferably tapered at its end. The stem 7 is of sufficient length to allow the threaded plug 8 to project through and beyond the nipple 5 when the sleeve 4 is screwed up to the position shown in Figs. 1 and 2, so that an internally-threaded dust-cap 9 may be secured to the projecting end of the plug. A spiral spring 10 surrounds the stem 7, one end of said spring bearing against the shoulder 3 of the casing and the opposite end thereof against the inner end of the plug 8.

The conical valve-seat 2 is secured to the tire in any preferred manner, and the operation of the device is as follows: By removing the dust-cap 9 and unscrewing the sleeve 4 until it reaches the position shown in Fig. 3 the plug 8 is disengaged from the nipple 5, leaving the latter free to be engaged by the threaded thimble or ferrule of a suitable air-supply pipe. The entrance of air under pressure raises the valve 6 against the tension of the spring 10, thus permitting the air to enter and inflate the tire. After the inflation of the tire and the disconnection of the air-tube the sleeve is screwed back to its closed position, as shown in Figs. 1 and 2, which projects the plug 8 through the nipple 5, and the dust-cap is screwed on said plug.

To facilitate the turning of the dust-cap 8 and sleeve 4, both of these parts are externally milled, as shown at 11, and to effect a close joint or frictional connection between the meeting edges of the dust-cap and nipple these edges are preferably roughened.

In Fig. 4 I have shown a slightly-modified construction of valve, comprising a conical portion 6 and a collar 6ª, extending from the apex of the cone and fitting within the bore of the casing 2, said bore being preferably slightly enlarged to receive the collar extension of the valve.

It will be apparent from the drawings, in connection with the foregoing description, that the device may be quickly and easily operated and when closed will be effectually protected from dust and dirt.

I would have it understood that the invention includes all such changes and modifications in the shape of the valve and details of construction as may fall within the terms and scope of the following claims.

I claim—

1. A valve for pneumatic tires comprising an externally-threaded casing having a valve-seat; an internally-threaded sleeve fitting said casing and provided at one end with an internally-threaded nipple; a valve fitting said seat; a stem secured at one end to the valve and formed at its opposite end with a threaded plug fitting said nipple; and a dust-cap to engage the projecting end of the plug.

2. A valve for pneumatic tires, comprising an externally-threaded casing having a conical valve-seat and an internal annular shoulder; an internally-threaded sleeve fitting said casing and provided at one end with an internally-threaded nipple; a conical valve fitting said seat; a valve-stem secured at one end to the valve, and provided at its opposite end with a threaded plug, adapted to project through and beyond said nipple; a coil-spring surrounding the stem and held between the plug and the shoulder of the casing.

3. A valve for pneumatic tires, comprising an externally-threaded cylindrical casing formed with a conical valve-seat; and an internal annular shoulder; an internally-threaded sleeve fitting said casing and provided at one end with an internally-threaded nipple; a valve fitting the valve-seat; a stem secured at one end to the valve and provided at its opposite end with a threaded plug adapted to be engaged by said nipple; and a dust-cap fitting the end of the plug and adapted to abut against the end of the nipple.

In testimony whereof I affix my signature in presence of two witnesses.

JOHN A SPENCER.

Witnesses:
RICHARD S. WALTON,
C. P. TREEBEY.